United States Patent
Madawala et al.

(10) Patent No.: US 11,223,233 B2
(45) Date of Patent: Jan. 11, 2022

(54) MULTILEVEL CONVERTER

(71) Applicants: Udaya Kumara Madawala, Stonefields (NZ); Duleep Jayanath Thirmawithana, Mt Wellington (NZ); Hamid Reza Rahnamaee, Mount Eden (NZ); Auckland UniServices Limited, Auckland (NZ)

(72) Inventors: Udaya Kumara Madawala, Stonefields (NZ); Duleep Jayanath Thirmawithana, Mt Wellington (NZ); Hamid Reza Rahnamaee, Mount Eden (NZ)

(73) Assignee: AUCKLAND UNISERVICES LIMITED, Auckland (NZ)

( * ) Notice: Subject to any disclaimer, the term of this patent is extended or adjusted under 35 U.S.C. 154(b) by 261 days.

(21) Appl. No.: 15/120,385

(22) PCT Filed: Feb. 23, 2015

(86) PCT No.: PCT/NZ2015/050016
§ 371 (c)(1),
(2) Date: Aug. 19, 2016

(87) PCT Pub. No.: WO2015/126264
PCT Pub. Date: Aug. 27, 2015

(65) Prior Publication Data
US 2017/0070096 A1   Mar. 9, 2017

(30) Foreign Application Priority Data
Feb. 21, 2014   (NZ) .......................... 621294

(51) Int. Cl.
*H01F 27/42* (2006.01)
*H01F 37/00* (2006.01)
(Continued)

(52) U.S. Cl.
CPC ............ *H02J 50/12* (2016.02); *B60L 53/122* (2019.02); *H02J 7/025* (2013.01); *H02J 7/045* (2013.01); *H02M 7/483* (2013.01); *H02M 7/4815* (2021.05)

(58) Field of Classification Search
CPC ............ H02J 50/12; H02J 7/045; H02J 7/025; H02M 2007/4815; H02M 7/483; B60L 11/182; Y02B 70/1441
See application file for complete search history.

(56) References Cited

U.S. PATENT DOCUMENTS

| 4,137,570 A | 1/1979 | Baker |
| 2005/0127853 A1* | 6/2005 | Su .......................... H02M 7/487 318/108 |

(Continued)

FOREIGN PATENT DOCUMENTS

| CN | 103003897 A | 3/2013 |
| CN | 103414260 A | 11/2013 |

(Continued)

OTHER PUBLICATIONS

"International Application No. PCT/NZ2015/050016, International Preliminary Report on Patentability dated Sep. 1, 2016", (dated Sep. 1, 2016), 9 pgs.

(Continued)

*Primary Examiner* — Hal Kaplan
*Assistant Examiner* — Rasem Mourad
(74) *Attorney, Agent, or Firm* — Pilloff Passino & Cosenza LLP; Martin J Cosenza

(57) ABSTRACT

An inductive power transfer (IPT) converter has a first switching means adapted to produce a time varying input power signal comprising a substantially unipolar stepped waveform, and a second switching means adapted to modify the time varying input power signal provided by the first (Continued)

switching means to produce a modified input power signal. The converter is coupled to a resonant circuit to receive the modified input signal.

20 Claims, 13 Drawing Sheets

(51) Int. Cl.
*H01F 38/00* (2006.01)
*H02J 50/12* (2016.01)
*B60L 53/122* (2019.01)
*H02J 7/02* (2016.01)
*H02J 7/04* (2006.01)
*H02M 7/483* (2007.01)
*H02M 7/48* (2007.01)

(56) References Cited

U.S. PATENT DOCUMENTS

| | | | |
|---|---|---|---|
| 2010/0123451 A1 | 5/2010 | Freer | |
| 2011/0254379 A1* | 10/2011 | Madawala | H02J 5/005 307/104 |
| 2011/0280052 A1* | 11/2011 | Al-Haddad | H02M 7/483 363/84 |
| 2012/0113695 A1 | 5/2012 | Chivite et al. | |
| 2013/0147281 A1* | 6/2013 | Kamata | H02J 7/025 307/104 |
| 2013/0229061 A1 | 9/2013 | Budhia et al. | |
| 2013/0249322 A1* | 9/2013 | Zhang | H02M 7/483 307/151 |
| 2013/0260676 A1 | 10/2013 | Singh | |
| 2013/0270919 A1* | 10/2013 | Miller | H02J 50/12 307/104 |
| 2013/0320759 A1* | 12/2013 | Abe | H02J 50/80 307/10.1 |
| 2014/0252870 A1* | 9/2014 | Covic | H02J 5/005 307/104 |
| 2015/0108945 A1* | 4/2015 | Yan | H02J 7/0042 320/108 |

FOREIGN PATENT DOCUMENTS

| | | |
|---|---|---|
| JP | 59-096876 A | 6/1984 |
| JP | 2000-277286 A | 10/2000 |
| WO | WO-2011/031169 A1 | 3/2011 |
| WO | WO-2011/160678 A1 | 12/2011 |
| WO | WO-2013/019124 A1 | 2/2013 |
| WO | WO-2013/136623 A1 | 9/2013 |
| WO | WO-2013/137749 A1 | 9/2013 |
| WO | WO-2015/126264 | 8/2015 |

OTHER PUBLICATIONS

"International Application No. PCT/NZ2015/050016, International Search Report and Written Opinion dated Apr. 17, 2015", (dated Apr. 17, 2015), 14 pgs.
"Chinese Application Serial No. 201580012317.X, First Office Action dated Apr. 25, 2017", (w/ English Translation), 22 pgs.
"Chinese Application Serial No. 201580012317.X, Second Office Action dated Dec. 19, 2017", (w/ English Translation), 25 pgs.
"Chinese Application Serial No. 201580012317.X, Third Office Action dated Mar. 28, 2019", (w/ English Translation), 23 pgs.
"Chinese Application Serial No. 201580012317.X, Fourth Office Action dated Jun. 19, 2019", (w/ English Translation), 9 pgs.
"Chinese Application Serial No. 201580012317.X, Fifth Office Action dated Oct. 12, 2019", (w/ English Translation), 8 pgs.
"European Application Serial No. 15751696.4, Office Action dated Apr. 15, 2019", 4 pgs.
"European Application Serial No. 15751696.4, Office Action dated Aug. 27, 2018", 4 pgs.
"European Application Serial No. 15751696.4, Supplementary European Search Report dated Jun. 26, 2017", 7 pgs.
"Japanese Application Serial No. 2016-570757, Office Action dated Jan. 22, 2019", (w/ English Translation), 7 pgs.
"Japanese Application Serial No. 2016-570757, Office Action dated Aug. 20, 2019", (w/ English Translation), 7 pgs.
"Japanese Application Serial No. 2016-570757, Search Report by Registered Search Organization dated Dec. 27, 2018", (w/ English Translation), 19 pgs.

* cited by examiner

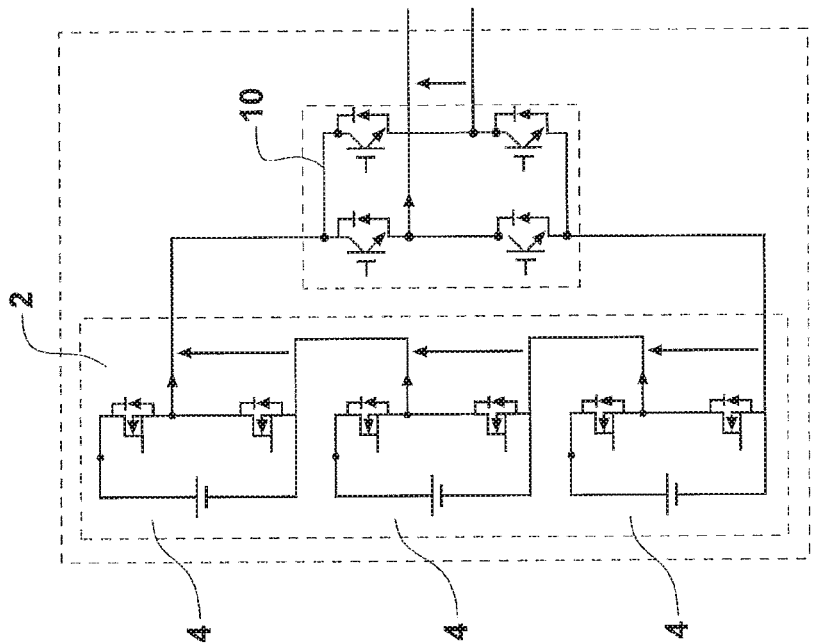
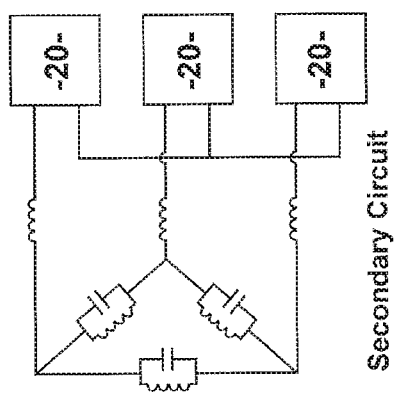
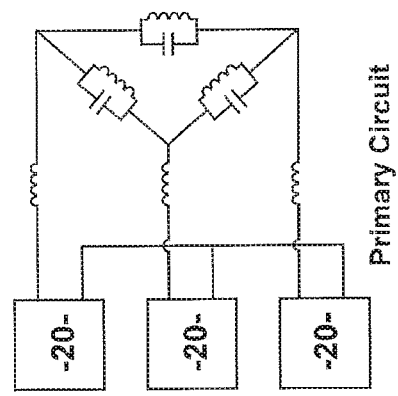
Figure 6A
Figure 6B

--PRIOR ART--

MULTILEVEL CONVERTER

PRIORITY CLAIM TO RELATED APPLICATIONS

This application is a U.S. national stage application filed under 35 U.S.C. § 371 from International Application Serial No. PCT/NZ2015/050016, which was filed 23 Feb. 2015, and published as WO2015/126264 on 27 Aug. 2015, and which claims priority to New Zealand Application No. 621294, filed 21 Feb. 2014, which applications and publication are incorporated by reference as if reproduced herein and made a part hereof in their entirety, and the benefit of priority of each of which is claimed herein.

FIELD OF THE INVENTION

The present invention relates to a multilevel converter. It has particular relevance to a converter for an inductive power transfer (IPT) system.

BACKGROUND

IPT systems traditionally employ either uni-directional or bi-directional (BD) H-bridge converters with IGBT switches to regulate the power level. The switching frequency is limited to around 10-20 kHz to contain the system losses and overall cost within acceptable levels. Higher frequency operation of IPT systems enables implementation of compact fast charging systems. However at higher frequencies, IGBTs have poor switching capability as well as poor dv/dt and di/dt, particularly in higher rated devices. Furthermore, conventional IGBT based converters produce undesirable harmonics, affecting both the cost and performance. Soft switching techniques and multi-level converter topologies have been proposed to alleviate these concerns to some extent, but these methods introduce their own disadvantages.

A typical BD-IPT system, as shown in FIG. 13, uses IGBT based single H-bridge converters (SHB) to synthesize a high frequency AC voltage. The SHB converter could control the power level and power direction by changing the amplitude and relative phase of the voltages across the primary and secondary resonant circuits, Vpi and Vsi. Generally phase shift modulation (PSM) is adopted to control voltage magnitudes while keeping VAR consumption to a minimum with zero relative phase angle. With PSM, each phase leg of a converter is operated at 50% duty cycle with a phase delay of ($\pi$-2$\alpha$) between the two phase legs of each converter. $V_{pi}$ and $V_{si}$ are not sinusoidal and therefore the simplified power equation should be revised according to the corresponding Fourier series given by $$v_{pi} = \frac{4V_{dc,p}}{\pi} \sum_{n=1}^{\infty} \frac{1}{n}(\cos n\alpha_p \cdot \sin n\omega_T t)$$

and similarly, $$v_{si} = \frac{4V_{dc,s}}{\pi} \sum_{n=1}^{\infty} \frac{1}{n}(\cos n\alpha_s \cdot \sin(n\omega_T t + n\theta))$$

Where 'n' represents the harmonic and $V_{dc,p}$ and $V_{dc,s}$ are primary and secondary DC source voltages, while $\alpha_p$ and $\alpha_s$ correspond to phase shift angles of the primary and secondary converters, respectively.

The switching (operating) frequency is $f_T$ is defined as $$2\pi f_T = \omega_T = \frac{1}{\sqrt{L_{pt} \cdot C_{pt}}} = \frac{1}{\sqrt{L_{st} \cdot C_{st}}}$$

$$\omega_T = \frac{1}{\sqrt{(L_{pi,1} - 1/\omega_T^2 \cdot C_{pi}) \cdot C_{pt}}} = \frac{1}{\sqrt{(L_{si,1} - 1/\omega_T^2 \cdot C_{si}) \cdot C_{st}}}$$

However, switching losses become excessive even with PSM at high operating frequencies and hence IPT based fast charger implementation using H-bridge topology and IGBT devices is not viable. Therefore, it is necessary to develop a high frequency power converter for IPT systems that is suitable for high power applications, such as fast chargers, with lower switching losses and harmonic distortions as well as lower rates of dv/dt and di/dt.

One application of IPT systems is in electric vehicle (EV) chargers. In terms of output power level, EV chargers are classified into three main categories. Level 1 (L1) class refers to battery chargers that are supplied by a single phase, low voltage grid. For example, a 1.9 kW, 230 V/20 A supply. The charging process for a typical L1 battery charger takes about a day, which is more suitable for overnight charging at homes. A semi-fast or level 2 (L2) charger, which supplies EVs up to 20 kW, needs to be connected to a 3 phase or high current single phase outlet. L2 chargers are used in both private and public facilities and could charge electric vehicles in a few hours. Fast chargers, which are categorized as level 3 (L3), work at power levels as high as 100 kW and the charging time can be as low as 15 minutes. Unlike most L1 and L2 chargers, L3 chargers are off-board and are supplied by a high current three-phase or DC voltage connection. The L3 fast charger is intended to eliminate the charging time limitation but it may impact on the performance of the grid distribution network, including thermal loading, voltage regulation, harmonic distortion levels, unbalances, losses and transformer life.

OBJECTS OF THE INVENTION

It is an object of the invention to provide a new convertor, or IPT converter, which will at least go some way to overcoming disadvantages of existing systems, or which will at least provide a useful alternative to existing systems.

Further objects of the invention will become apparent from the following description.

SUMMARY OF INVENTION

Accordingly in one aspect the invention broadly provides an IPT converter comprising;
a first switching means adapted to produce a time varying input power signal,
a second switching means adapted to modify the input power signal provided by the first switching means to produce a modified input power signal,
a resonant circuit adapted to provide wireless power transfer, and coupled
to the resonant circuit.

In another aspect the invention broadly provides an inductive power transfer (IPT) converter comprising:
a first switching means adapted to produce a time varying input power signal comprising a substantially unipolar stepped waveform, a second switching means adapted to modify the time varying input power signal provided by the first switching means to produce a modified input power signal, and a resonant circuit adapted to provide wireless power transfer, and coupled to receive the modified input power signal.

In another aspect the invention broadly provides an inductive power transfer (IPT) converter with at least two switching stages, the converter comprising;
 a first switching means adapted to produce a time varying input power signal,
 a second switching means adapted to modify the input power signal provided by the first switching means to produce a modified input power signal,
 a resonant circuit adapted to provide wireless power transfer, wherein the modified input power signal is provided to the resonant circuit, and
 wherein the input power signal is modulated by the first switching means such that the input power signal provides at least one of a lower switching current, voltage and power to the second switching means, so as to allow the second switching means to operate at higher frequencies.
 using high power components without introducing high losses.

In an embodiment the first switching means operates at a higher frequency than the second switching means. In an embodiment the first switching means may be MOSFETs.

In an embodiment the second switching means has a higher power capability or rating than the first switching means. In an embodiment the second switching means may be IGBTs.

In an embodiment the second switching means switches at zero, or substantially zero current.

In an embodiment the switching frequency of the second switching means is above 40 kHz.

In an embodiment the switching frequency of the second switching means is in the range 60-100 kHz.

In an embodiment the switching frequency of the second switching means is 70-85 kHz.

In an embodiment the modification of the input power signal by the second switching means includes inversion.

In an embodiment the modified input power signal comprises a stepped waveform which is substantial like a sine wave.

In an embodiment the modified input power signal substantially comprises a staircase sine wave.

In an embodiment the first switching means uses selective harmonic elimination when producing the time varying input power signal.

In an embodiment the $3^{rd}$ and $9^{th}$ harmonic are reduced, attenuated or removed.

In an embodiment the first switching means produces a time varying input power signal which enables the second switching means to operate at a higher frequency.

In an embodiment the time varying input power signal is produced with low power regions.

In an embodiment the low power regions may be substantially synchronised with the second switching means switches.

In an embodiment the first switching means comprises a plurality of modules.

In an embodiment one or more of the plurality of modules are switched into or out of a circuit to provide a modulation of the input power signal.

In an embodiment at least one of the modules comprises a cascaded half-bridge converter.

In an embodiment at least one of the modules comprises a voltage source.

In an embodiment one of the modules contains a voltage source which cannot be disconnected from the circuit.

In an embodiment at least one of the modules comprises one or more switches.

In an embodiment the time varying input power signal is a stepped signal.

In an embodiment the time varying input power signal is a modulated signal.

In an embodiment the first switching means produces a staircase input power signal.

In an embodiment the second switching means is an H-bridge inverter.

In an embodiment the IPT converter is a three phase converter.

In an embodiment the IPT converter is a primary converter.

In an embodiment the IPT converter is a secondary or pick-up converter.

In a further aspect the invention may broadly be said to consist in an IPT converter as claimed in the first aspect for an electric car charger.

According to another aspect, the invention broadly provides a method of operating an IPT converter having a first switching means, a second switching means and a resonant circuit, the method comprising the steps of:
 Switching the first switching means to create a time varying input power signal,
 Providing the time varying input signal to the second switching means,
 Switching the second switching means to modify the time-varying input signal, and
 Providing the modified input signal to the resonant circuit.

In an embodiment the first switching means creates a stepped input power signal.

In an embodiment the time varying input power signal has a frequency related to the resonant circuit frequency.

In an embodiment the method further comprises the step of loosely coupling the resonant circuit to a secondary.

In an embodiment the method further comprises the step of transferring power wirelessly using the resonant circuit.

According to another aspect, the invention broadly provides in a converter for an IPT system comprising;
 a first switching means adapted to produce an input power signal from one or more DC sources, the input power signal having selected frequency components,
 a second switching means adapted to modify the input power signal provided by the first switching means,
 a resonant circuit adapted to provide wireless power transfer, and
 wherein the modified input power signal is provided to the resonant circuit.

In an embodiment the selected frequency components create a time varying signal.

In an embodiment the selected frequency components create a stepped or staircase signal.

In an embodiment the selected frequency components include harmonics relating to the frequency of the resonant circuit.

In an embodiment the selected frequency components form a waveform which approximates an absolute valued sine wave.

In an embodiment the selected frequency components reduce or attenuate selected frequencies.

In an embodiment the third and/or ninth harmonics are attenuated.

In an embodiment the first switching means comprises a plurality of DC sources.

According to a fourth aspect, the invention may broadly be said to consist in an IPT system comprising a converter as described in the first or third aspects.

In an embodiment the converter may be on the primary side.

In an embodiment the converter may be on the secondary side.

In an embodiment the IPT system may comprise a converter as described in the first or third aspects on the primary and secondary side.

In a further aspect the invention may comprise an IPT converter as herein described with reference to one or more of FIGS. 1 to 12.

In a further aspect the invention may comprise a method of operating an IPT converter as herein described with reference to one or more of FIGS. 1 to 12.

In a further aspect the invention may comprise an IPT system as herein described with reference to one or more of FIGS. 1 to 12.

The embodiments described above may be applied to any one or more of the aspects outlined.

The disclosed subject matter also provides connector apparatus or connection of methods which may broadly be said to consist in the parts, elements and features referred to or indicated in this specification, individually or collectively, in any or all combinations of two or more of those parts, elements or features. Where specific integers are mentioned in this specification which have known equivalents in the art to which the invention relates, such known equivalents are deemed to be incorporated in the specification.

Further aspects of the invention, which should be considered in all its novel aspects, will become apparent from the following description.

DRAWING DESCRIPTION

A number of embodiments of the invention will now be described by way of example with reference to the drawings in which:

FIGS. 6a and 6b are a diagram of a first embodiment of a 3 phase IPT converter according to the invention.

DETAILED DESCRIPTION OF THE DRAWINGS

Figure 1:
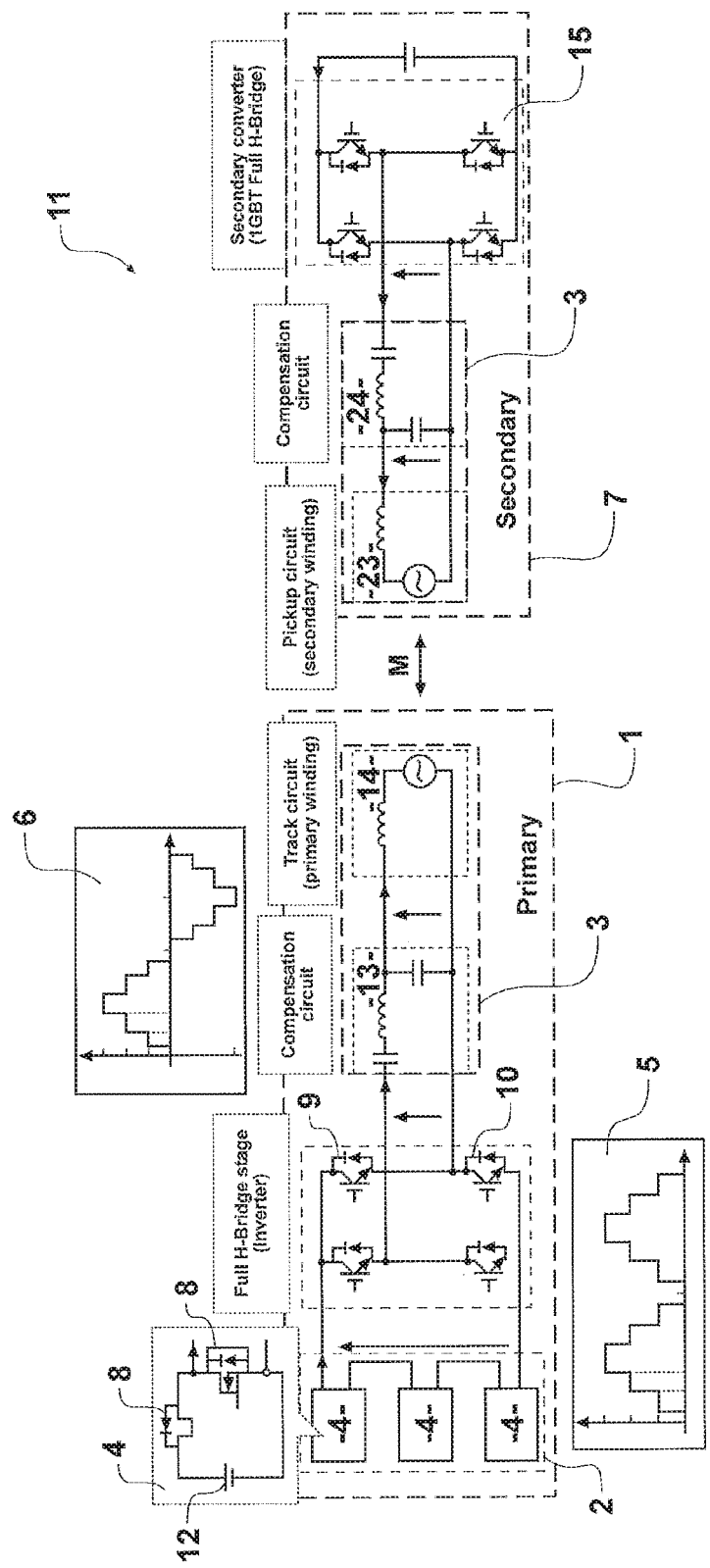
FIG. 1 is a diagram of a first embodiment of an IPT system according to the invention.

Throughout the description like reference numerals will be used to refer to like features in different embodiments.

Although the multilevel converter is described in relation to an IPT system it may have uses not requiring a resonant circuit or wireless power transfer. The system may have relevance to electric car charging. As described above, the L3 charger requires fast charging and power levels as high as 100 kW, and embodiments as described below may allow design of such a fast, high power system. Alternatively the converter may be used in any one of the wide variety of IPT systems.

Referring first to FIG. 1 an inductive power transfer (IPT) system 11 is shown, the IPT system having a power supply, primary, or track side 1 able to generate an electromagnetic field, and a secondary or pick-up 7 able to receive power from the generated field. The primary and secondary may be referred to as being loosely coupled. In this case the primary is shown with a convertor in accordance with one embodiment of the invention. The multilevel converter has a first switching means in the form of a level stage 2 and a second switch means in the form of an inverter stage 10.

The first switching means 2, second switching means 10 and the resonant circuit 3 form a circuit which may allow the creation of an electromagnetic field for transmitting power wirelessly.

The resonant circuit 3 may include a compensation circuit 13 and a primary winding 14. The winding 14 may be provided as a coil for example, or a series of coils, or as an elongate loop in the form of a track. However it is clear to one skilled in the art that variations in the resonant circuit 3 are possible without affecting the operation of the invention.

The embodiment of FIG. 1 shows a secondary 7 with a resonant circuit 14 and a secondary switching means 15. Although the illustrated embodiment is a full H-bridge converter, alternative switching means are possible. In some embodiments the secondary 7 may comprise a second embodiment of the invention or a diode rectifier. In some embodiments the design of the secondary 7 may be adapted so as to manage a high frequency operation of the primary 3.

Figure 2:
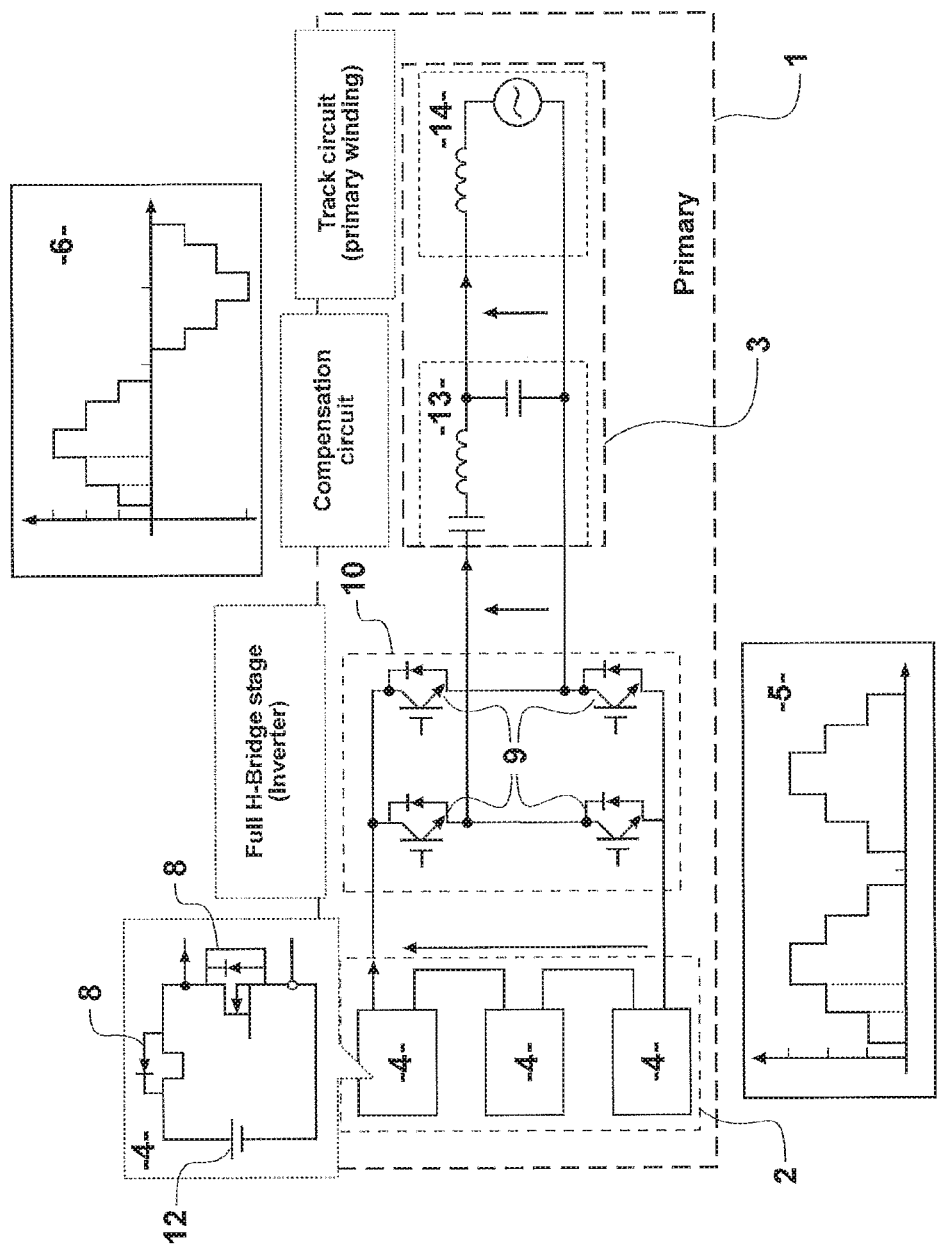
FIG. 2 is a diagram of a first embodiment of a converter according to the invention.

Referring now to FIG. 2 the primary converter 1 is shown in more detail. The level stage or first switching means 2 is shown with three cascaded modules 4, although any number of modules is possible. A further embodiment includes seven modules 4. In selecting an appropriate number of modules 4, power requirements, cost, switching frequency and complexity may be taken into account.

An embodiment of a module 4, with a voltage source 12 Vpdc and two switches 8 Sp+ and Sp−, is also shown in FIG. 2. This embodiment provides a simple means to switch the voltage source 12 into or out the circuit and therefore change whether it contributes to the input power signal 5, Vlvl. Therefore the input power signal 5 becomes modulated, stepped or time-varying. In one embodiment the first switching means provides circling that provides a time varying input signal 5 that comprises a substantially unipolar half sine wave stepped waveform. It should be understood that variations in the module design are possible without changing the effect of the invention. In an embodiment the switches 8 are MOSFETs capable of high frequency switching. In an embodiment the reduced voltage or power level being switched when compared to the maximum input voltage Vlvl,max or power, may allow the use of lower power switches.

Still referring to FIG. 2, a full H-bridge converter is shown. This is an embodiment of the inverter stage 10 or second switching means 10. The second switching means takes as an input the time varying input power signal 5 produced by the first switching means 2. The second switching means may comprise one or more switches 9. In an embodiment the switches 9 may be IGBTs. In an embodiment the second switching means may be a full H-bridge. The second switching means modifies the time varying or modulated input power signal 5 to produce a modified input power signal 6. This modification may comprise an inversion of the modulated input power signal 5. In an embodiment this may result in a stepped sinusoidal type waveform 6 as shown in FIGS. 1 and 2.

Figure 4:
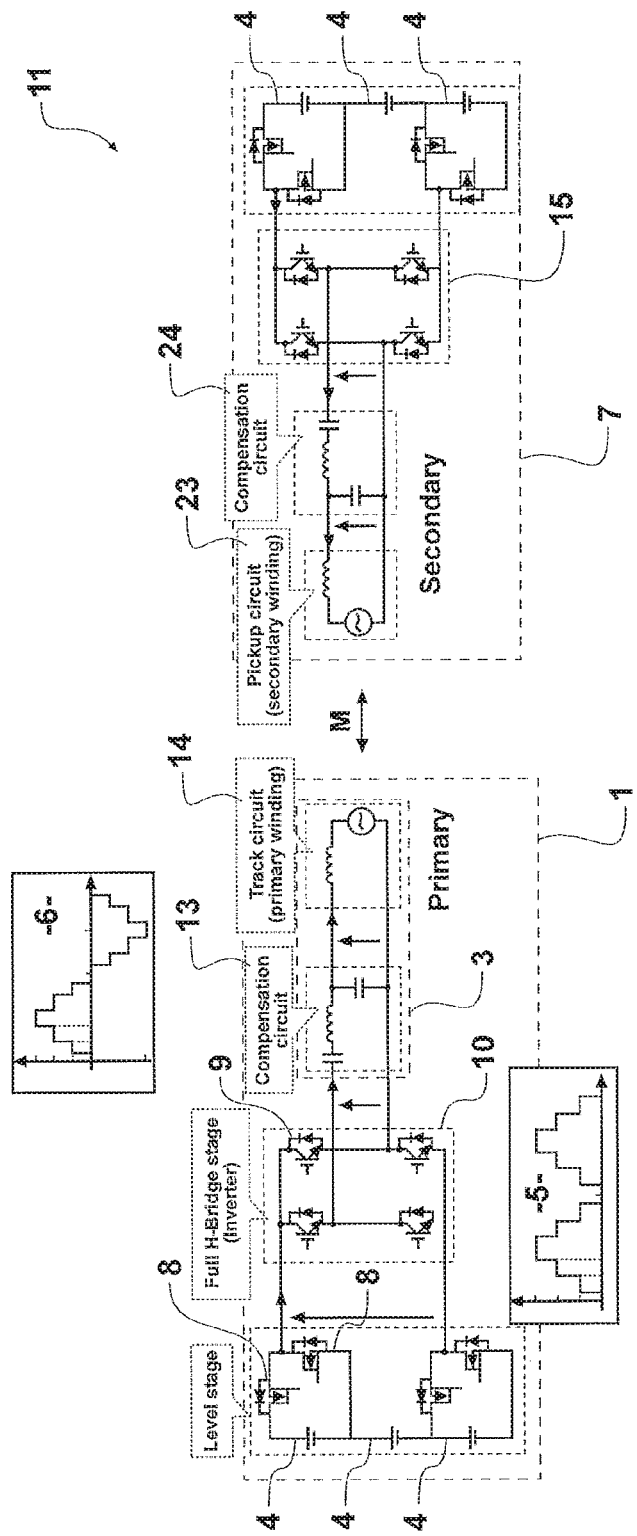
FIG. 4 is a diagram of a second embodiment of an IPT system according to the invention.

The time-varying input power signal 5 allows improved switching performance of the second switching means 10 as compared to a switching means having as an input the full input voltage Vlvl,max. The user of the level stage 2 allows a zero current and/or voltage switching at the inverter stage 10 in some embodiments. For example, the waveforms shown in FIG. 2 demonstrate switching of the second switching means 10 at a zero voltage point. In embodiments where the modulated input power signal 5 does not reach zero volts the voltage level is still reduced. The example in FIG. 4 shows the switching voltage at approximately a third of the maximum voltage. The reduced power flow when switching the second switching means 10, in particular where no current is flowing, reduces switching losses and switching times allowing for switching as higher frequencies when compared to a typical system. The time-varying input power signal 5 may be designed so as to resemble an absolute valued sine wave. In an embodiment the frequency of the time-varying signal will be substantially similar to, or twice, the tuned frequency of the resonant circuit 3 and/or power transfer.

Figure 3:
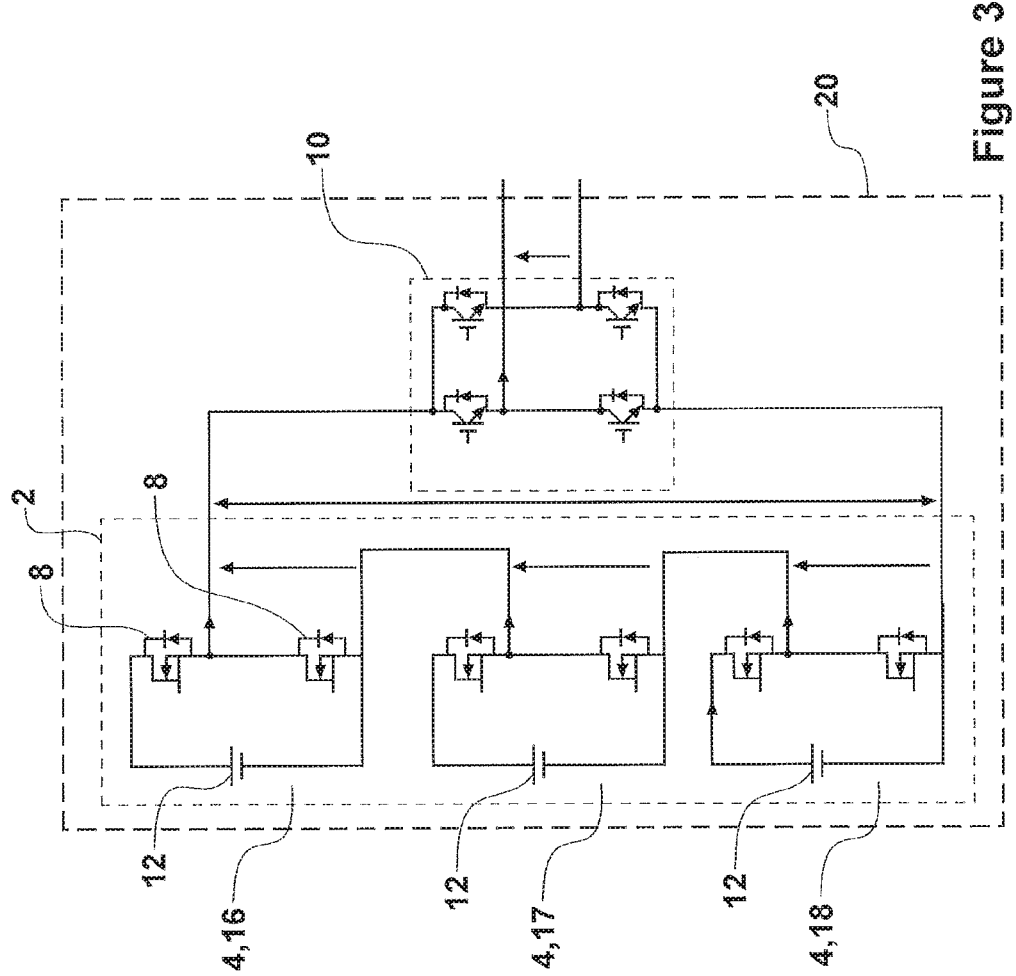
FIG. 3 is a schematic of a first embodiment of a first switching means according to the invention.

Referring to FIG. 3 an embodiment of the level stage 2 or first switching means 2 is shown which is adapted to produce a time-varying power signal. In an embodiment it may comprise a plurality of modules or levels or units 4. Each module 4 may comprise a voltage source 12 and may also include one or more switching devices 8. A time varying or modulated or stepped or non-constant power signal 5 may be formed by an appropriate summation of the modules as controlled by the switching. For instance, considering the three module level stage 2 shown, a stepped or staircase type modulated input signal 5 can be generated with 7 levels. The time-varying signal may be adapted to include low power regions, where the current and/or voltage is low or substantially zero. The operation of the second switching means switches may be substantially aligned or synchronised with the low power regions so as to improve the di/dt and/or dv/dt characteristics of the switching.

Beginning with all modules 16, 17, 18 switched out of the circuit, Vlvl is zero, switching on, S31+ and off S31− switches a voltage source 12, Vdc3, into the circuit and Vlvl is now equal to Vdc3. Next switch Sp21− may open and switch SP21+ close introducing a voltage source 12, Vdc2, into the circuit and increasing the input power signal where Vlvl is now the summation of Vdc2 and Vdc3. Finally, in the case of a three level converter switches Sp11− and Sp11+ can be switched so as to introduce Vdc1 into the circuit. This provides the maximum power output by summation of Vdc1, VDc2 and Vdc3 as the output Vlvl. The reverse of the described approach returns the voltage to a base level which may be zero. The switching means may operate in with constant timing, or different periods may be used to modulate the power signal appropriately. Similarly the voltage sources 12 may be similar or may vary in size. In the illustrated embodiment the switches 8 have a maximum switching voltage, e.g. Vi1-3 less than the maximum voltage Vlvl. This allows lower rated switches to be used. In an embodiment the switches used may be MOSFETs capable of high frequency operation at the desired power levels. The frequency of operation can be important as the switches may be operated multiple times in a single waveform or cycle.

Referring again to FIG. 2 the overall performance of the multilevel converter 1 may be reviewed. The first switching means 2 produces a modulated input power signal 5, in the shown embodiment this is a staircase signal. This signal then passes to the second switching means 10 which operates to produce a modified input power signal 6. In the embodiment shown the modification is an inversion of half of the input power signal 5. The modulated input signal 5 may be advantageous because it provides a lower switching current and/or voltage and/or power for the second switching means. This allows the second switching means 10 to operate at a higher frequency using high power components without introducing high losses. The attainable resonant frequency supplied to the resonant circuit 3 is above the typical operating frequency of an IPT system of 10-20 kHz. In some embodiments the converter 1 may operate up to frequencies of 40 kHz, 100 kHz, or higher using this technique. The improvements made to the operation of the switches may allow for IGBTs which typically operate at high power but relatively slow switching speeds to be used for the second switching means. As the first switching means operates at relatively lower power and higher frequency MOSFETs may be used. This embodiment may therefore allow for a cost effective IGBTs to be used while achieving higher switching frequencies.

The operation of the converter 1 may alternatively be viewed as the first switching means 2 selecting frequency components for the input signal. The first switching means 2 has varied the input signal 5 to produce a signal having selected frequency components which is supplied to the second switching means 10. The frequency components of the time varying input signal 5 may resemble more closely those of the desired resonant frequency. In some embodiments the selected frequencies may relate to the tuned frequency of the resonant circuit 3. The relation may be to an intermediate step, for instance the selected frequencies may approximately form an absolute valued sine wave. In an embodiment the dominant harmonic of the selected frequency components may be the frequency of the resonant circuit or double the frequency of the resonant circuit. FIG. 2 shows the modulated input signal 5 producing a stepped or staircase waveform 5 shaped, with each half period resembling the unipolar (in this example positive) portion of a sine wave. The second switching means 10 then modifies the time varying or modulated input waveform 5 to produce a modified bipolar full sinewave input power signal waveform 6. The operation of the second switching means 10 may be made more effective and efficient by the reduction in bandwidth of the input power signal 5. The second switching means 10 no longer has to conduct or switch at least a portion of undesirable frequencies of a typical DC input signal. Therefore the switching frequency of the second switching means 10 may be increased without increasing losses overall.

Referring now to FIG. 4 an embodiment is shown with primary 1 and secondary 7 converters. In this embodiment the converters are of a similar multilevel converter type although this is not required. The first switching means 2 of each converter includes three modules. One of the modules 19 includes no switching elements. This may provide a more cost effective solution and requires fewer components. The remaining modules 4 show an embodiment as described earlier. The switching of these modules is similar to that described previously however the minimum voltage is no longer 0 but Vpdc. An embodiment of the change may be observed in the waveform of the modulated input power signal 5, where the staircase does not return to zero volts. In the shown embodiment the modified input power signal 6 is broadly similar to that produced by the embodiment of FIG. 1. This may be achieved by the operation of the second switching means 10. The second switching means 10 first opens the appropriate switches to stop the transmission of the input power signal, it then waits for an appropriate amount of time before switching the input power signal on in reverse to invert the signal and produce the desired modified input power signal 6. This produces the desired output while decreasing the number of components used. The second switching means 10 may no longer be switching at a zero power or current point; however the power level switched remains below the maximum.

Figure 5:
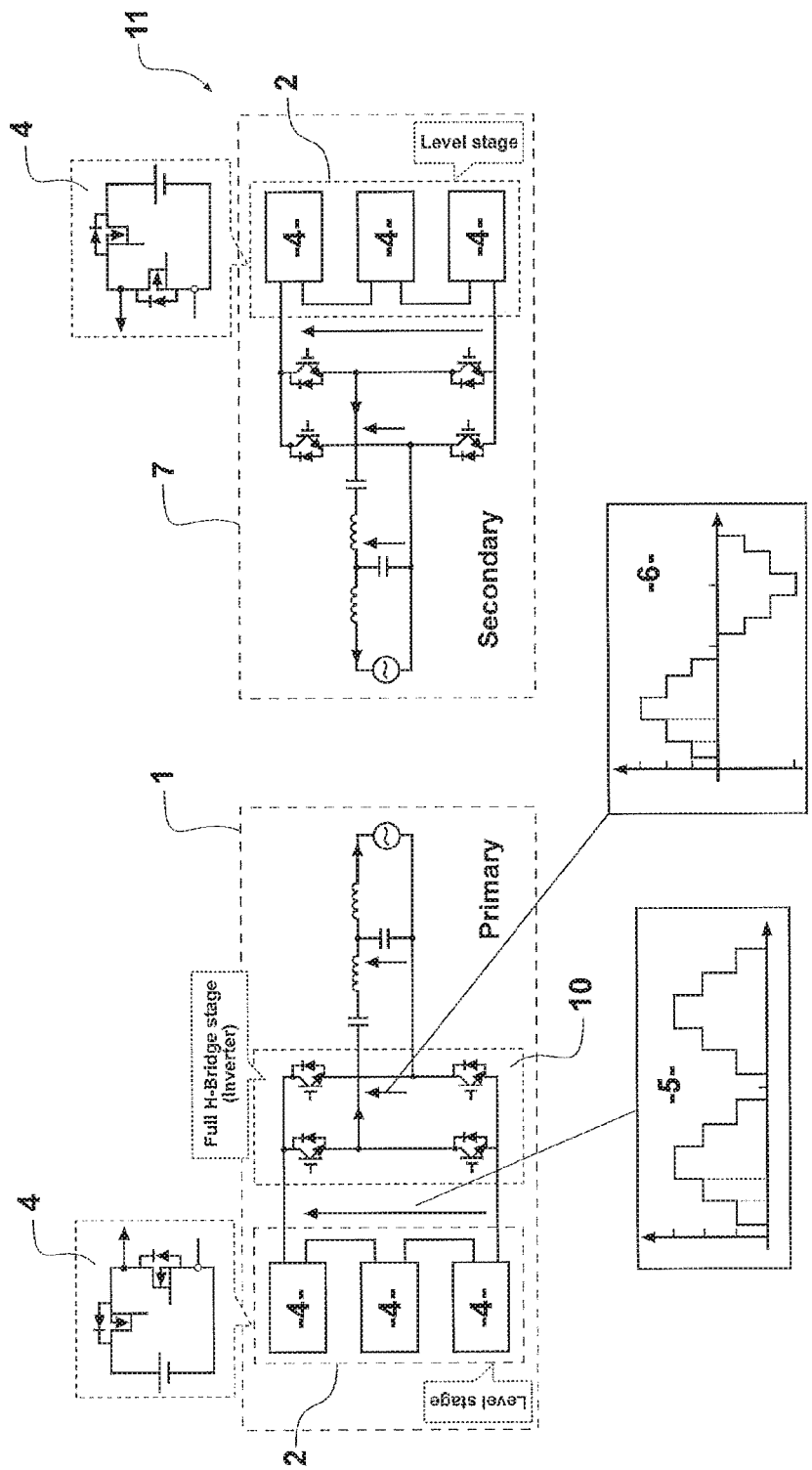
FIG. 5 is a diagram of a third embodiment of an IPT system according to the invention.

Referring now to FIG. 5 an embodiment is shown in which both the primary 1 and secondary 7 converters are multilevel converters as shown in FIG. 2. The embodiment shows a secondary resonant circuit 3 having a secondary winding 23 and a compensation circuit 24. Although a particular resonant circuit is shown a variety of resonant circuits may be used. In this embodiment the secondary converter can operate at the same, or substantially the same, frequency as the primary converter without increased switching losses. Alternatively a diode rectifier may be connected to the secondary resonant circuit 3 however this may not allow bi-directional power transfer. If, as in FIG. 1, a full H-bridge stage was used as the secondary converter and the resonant circuits operated at the same frequency it is likely that increased losses would occur as the H-bridge switching frequency would be too high for efficient operation of the typically used IGBTs.

Figure 7A:
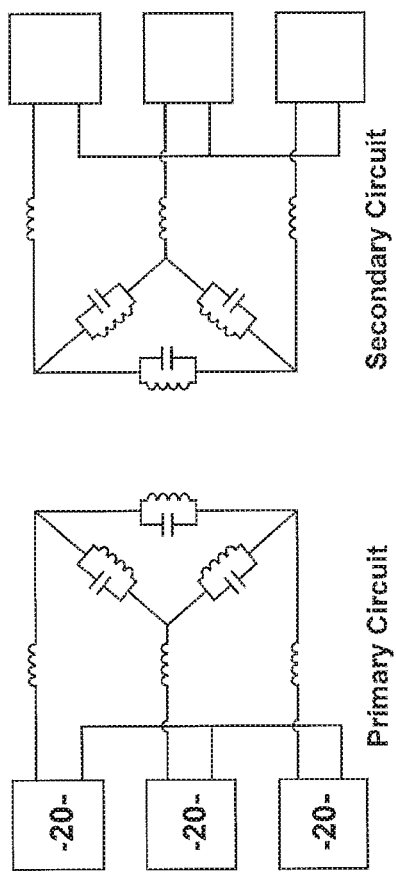
FIGS. 7a and 7b are a diagram of a second embodiment of a 3 phase IPT converter according to the invention.
Figure 7B:
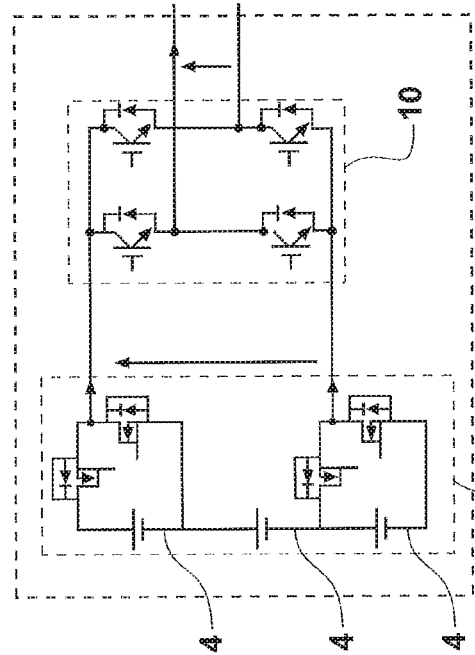

Referring now to FIGS. 6a and b the multilevel converter is shown as applied to a three phase converter suitable for an IPT system. The 3-phase system may require a converter for each phase 20 connected as shown in FIG. 6a in a delta arrangement, although they may also be connected in a star arrangement. Each phase converter 20 comprises a first switching means 2 and second switching means 10 which operate as described in relation to the single phase converter 1. In some embodiments the relationships between the phases may require synchronisation of the converters. FIGS. 7a and 7b show an embodiment of the three phase converter as shown in FIG. 4 for the single phase system.

Usually multilevel converters are employed to synthesize a desired high voltage from low voltage devices with reduced switching losses and harmonic content. Switching losses of a typical IGBT-based SHB converter largely contribute to the overall losses and increase further with frequency. In contrast, it appears that MOSFET based converter loss is governed more by the conduction loss which mostly depends on the on resistance Ron of a switch, RMS value of the switch current, and the number of switches.

The proposed converter of FIG. 1 consists of a level stage, which may be a cascaded half bridge MOSFET converter, and a full H-bridge IGBT converter. Typical voltage waveforms synthesized by each converter stage are also illustrated in FIG. 1. The converter may be employed on the primary side of the IPT system to generate high frequency currents that are necessary for high power applications. The full H-bridge converter is able to invert the voltage waveforms synthesized by the cascaded level units Vlvl to produce the desired output voltage to generate the desired current. The proposed topology uses few numbers of switching devices, particularly rated for high power levels, than typical systems.

To evaluate the performance of an embodiment, a 20 kW bidirectional IPT system as shown in FIG. 1, was modeled in comparison to a typical IPT system. A single H-bridge converter was used on the pickup side while a hybrid multi-level converter was used on the primary side of the IPT system. Parameters of the two systems used for simulations at two frequencies are given in Table I. Both systems were investigated under different power levels by controlling $v_{pi}$ through PSM while keeping $$\theta = \frac{\pi}{2}$$

and $v_S$ constant. Staircase modulation with the selective harmonic elimination (SHE) method was used in the hybrid multi-level converter, eliminating both 3rd and 9th harmonic voltages. Angles $\varphi_{p1}$, $\varphi_{p2}$ and $\varphi_{p3}$, shown in FIG. 1, are calculated by solving $$\cos(n\varphi_{p1}) + \cos(n\varphi_2) + \cos(n\varphi_{p2})$$

where n=3, 9

Both systems were simulated at two different frequencies of 20 kHz, 70 kHz and, for a fair comparison, it was assumed that the power levels for a given voltage are independent of the operating frequency so that $$\sqrt{L_{st}, L_{pt}} \times f_t = \text{Constant}$$

TABLE I

PARAMETERS OF THE TYPICAL BD-IPT SYSTEM

| Parameter | Value ($f_T$ = 20 kHz) | Value ($f_T$ = 70 kHz) |
|---|---|---|
| $V_{pdc}$ | | 600 V |
| $V_{pdc1}$, $V_{pdc2}$, $V_{pdc3}$ | | 200 V |
| $V_{sdc}$ | | 300 V |
| $L_{pi}$, $L_{pt}$, $L_{si}$, $L_{st}$ | 24 µH | 6.86 µH |
| $C_{pt}$, $C_{st}$ | 2.64 µF | 0.752 µF |
| $R_{pi}$, $R_{pt}$, $R_{si}$, $R_{st}$ | | 10 mΩ |
| k | | 0.3 |
| IGBT Switches | | IXYH40N90C3D1 |
| MOSFET Switches | | IXTQ69N30P |

The SHB topology, used in typical IPT consists of only four high power IGBT switches. In contrast, a conventional multi-level converter requires a large number of switches, resulting in a relatively more expensive and complicated system. The conventional cascaded multi-level topology, C-CML suffers from using a large number of switches. For example 2(N−1) MOSFET switches for an N level converter. According to Table II, the number of switching components increases considerably with number of voltage levels.

TABLE II

COMPARISON SWITCHES NUMBER IN DIFFERENT STUDIED
TOPOLOGIES AND SWITCHES PRICES

| Topology | Switches Quantity | Switches Cost<sup>a</sup> (USD) |
|---|---|---|
| Single H-Bridge | 4 × IGBT | 4 × 3.97 |
| Cascaded Multi-Level (N levels) [9] | 2(N − 1) × MOSFET | 12 × 6.3 |
| Proposed System (N Levels) | (N − 1) × MOSFET + 4 × IGBT | 6 × 6.3 + 4 × 3.97 |
| IGBT Switch | | IXYH40N90C3D1 |
| MOSFET Switch | | IXTQ69N30P | a Just switches cost for the case study (600 Vdc & 7 levels) has been considered The embodiment illustrated in FIG. 1 uses a multi-level converter with a reduced number of switches. It may use six MOSFET switches and four IGBT switches for a seven level converter. Table II shows that C-CML converter requires more switches in comparison to the proposed topology, particularly when the number of converter levels increases.

Figure 9:
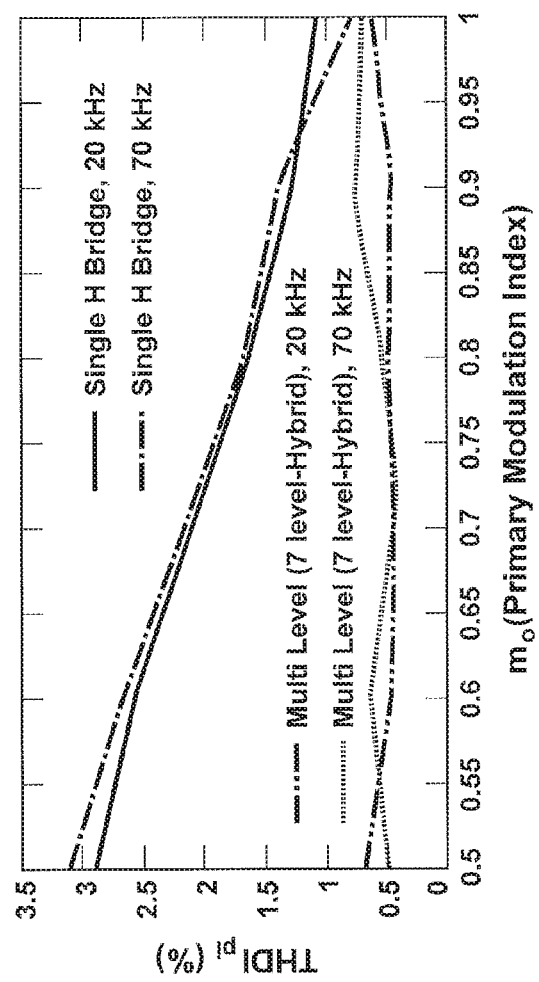
FIG. 9 is a comparison of THDIpt at typical and an embodiment of the invention at different primary voltage levels fT=20 kHz & 70 kHz.

Reducing total harmonic distortion (THD) associated with switching process is one of the multi-level converter advantages. FIG. 9 shows variation in THD for Ipi at different frequencies of operation and voltage levels. The trend in THD is similar for both converters. However, an increase of up to 70% in THD Ipi can be observed in the typical topology while it is about 20% in the proposed hybrid multi-level topology. FIG. 9 illustrates the THD Ipt for different frequencies and voltage levels. For the proposed system, the THD level is confined within 1% while it varies between 1-3% in the typical system. THD of current affects the inductor loss and components rating. Hence it could be argued that high THD Ipi may require component with higher ratings.

In the IPT system, converter loss, copper loss and core loss constitute the overall power loss. The converter loss is made up of the switching loss and the conduction loss. In this paper, the core loss and the losses due to THD are neglected. The copper losses are represented by resistors Rpi, Rsi, Rpt, and Rst. Since smaller inductors are employed in higher frequency, a decrease in copper loss is expected. Meanwhile, higher skin effect and proximity effect lead to more copper loss. Consequently, the amount of resistors representing the copper loss is assumed to remain unchanged in different frequencies, as given by Table II.

In both the typical system and the embodiment shown in FIG. 1 the conduction loss is proportional to Ipi,rms and Isi,rms. Furthermore, it is evident from that Isi1 and Ipi1" are proportional to Vpi1 and Vsi1, respectively, where index 1 refers to the fundamental component. Hence, ignoring THD,Ipi effects, the primary conduction power loss, Pcnd loss-p is expected to remain unchanged, when the power output was regulated through Vpi. In contrast, the secondary conduction power loss, Pcnd loss-s, is proportional to vpi. However, high THD Ipi level in the typical topology has a high impact on Ipi,rms and Pcnd loss-p In a proposed embodiment of the system the full H-bridge IGBT converter may operate at a zero current switching condition. Therefore the switching losses are mostly linked to the MOSFET based converter, while in the typical IPT system, the switching losses are related to the IGBT based full H-bridge.

Figure 8:
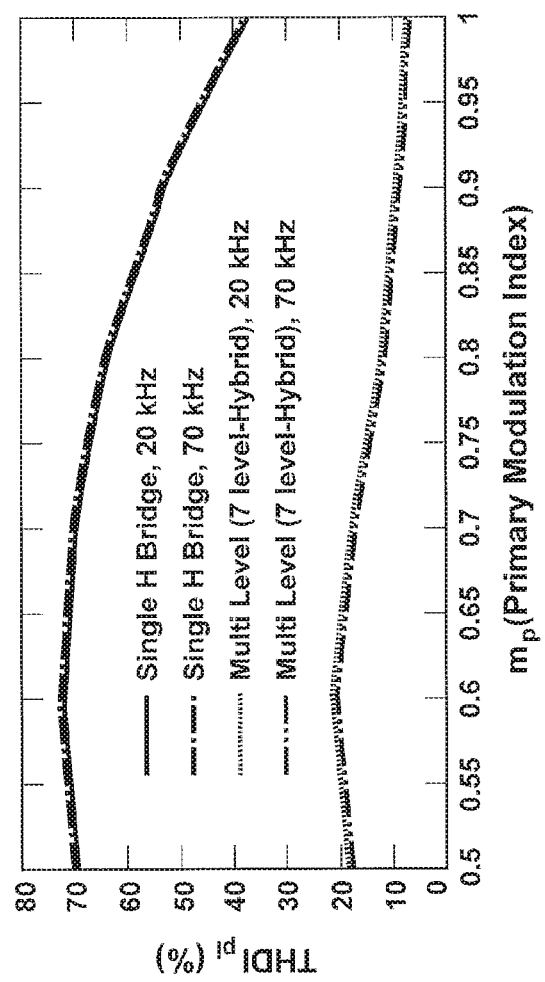
FIG. 8 is a comparison of THDIpi for a typical and an embodiment of the invention at different primary voltage levels fT=20 kHz & 70 kHz.
Figure 10:
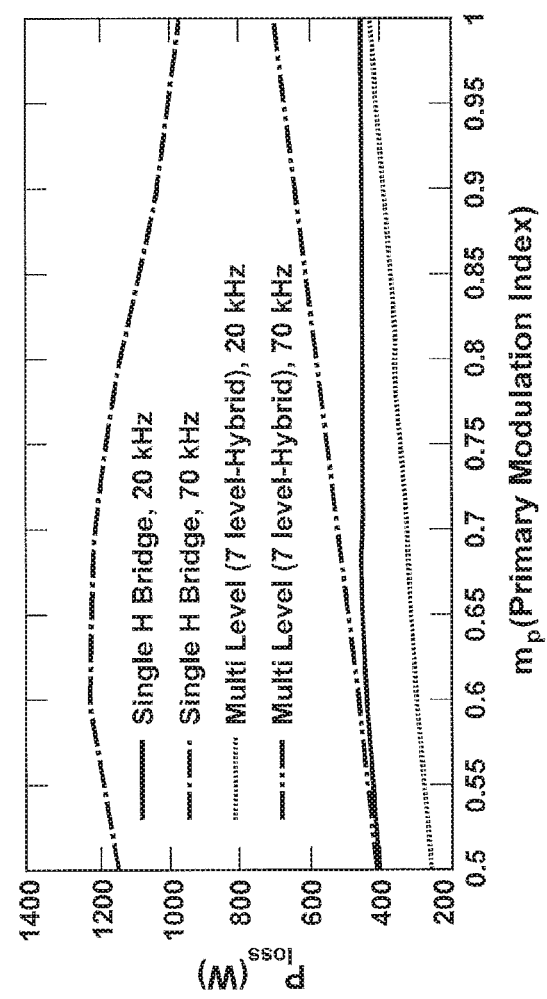
FIG. 10 is a comparison of power losses at typical and proposed topology at different primary voltage levels fT=20 kHz & 70 kHz.

Comparing FIG. 8 with FIG. 10, a positive correlation is observed between total power loss of the typical system, Pcnv loss, and THD Ipi. In contrast, total power loss of the proposed system, Ppr loss, is directly proportional to Vpi, as evident from FIG. 10. As FIG. 10 depicts, increasing the operating frequency may raise the power loss level in the typical IPT system more than the proposed system.

Figure 11:
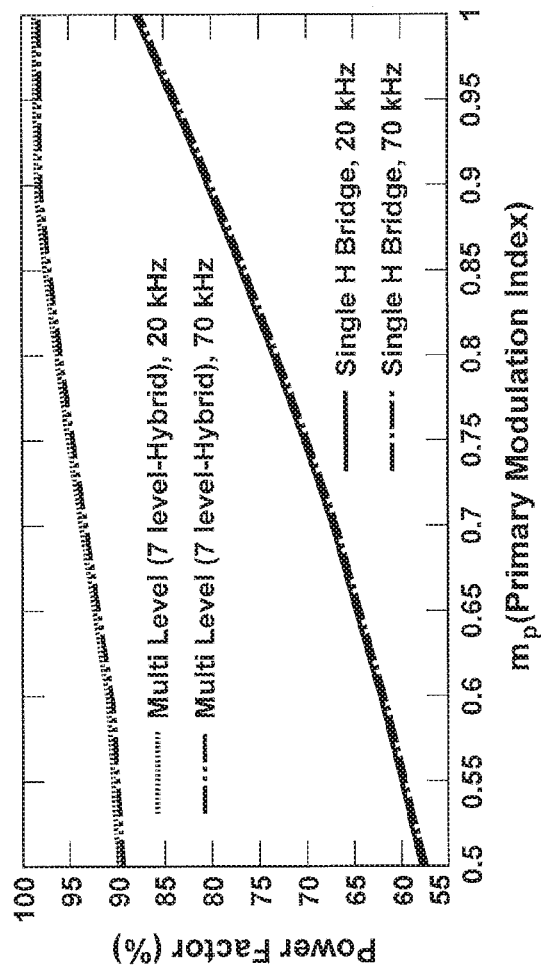
FIG. 11 is a comparison of power factors at typical and proposed topology at different primary voltage levels fT=20 kHz & 70 kHz.

The power factor seen by the primary converter, PFt, is given by:

$$PF_T \cong DF = \frac{1}{\sqrt{1 + THD_{V_{pi}}^2} \times \sqrt{1 + THD_{I_{pi}}^2}}$$

Where DF is the displacement factor. FIG. 11 illustrates that PFt is independent of the operating frequency. In FIG. 11, there is a clear trend of reducing PFt as mp decreases at both systems. However, the rate of reduction in PFt with mp is lower in the proposed IPT system. Furthermore, PFt in the proposed system has been improved, comparing with the typical IPT system. For example, the proposed topology has a PFt of 0.98 in the highest voltage level while it is 0.87 in the typical topology.

Figure 12:
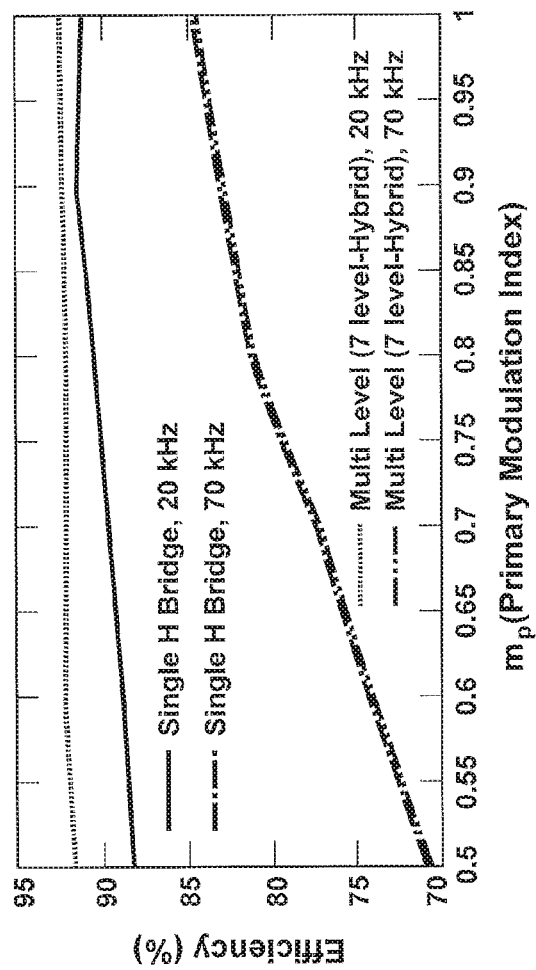
FIG. 12 is a comparison of efficiencies at conventional and proposed topology at different primary voltage levels fT=20 kHz & 70 kHz.
Figure 13:
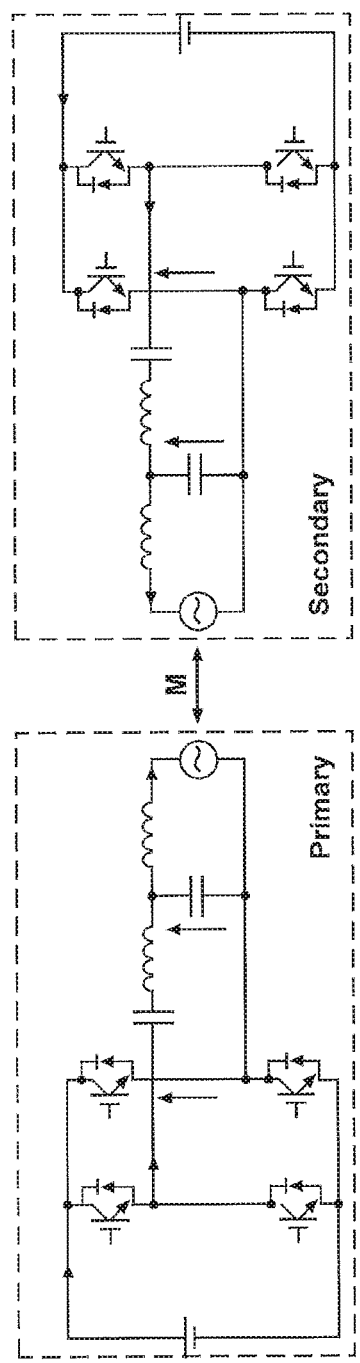
FIG. 13 is a diagram of a typical IPT converter.

FIG. 12 shows the efficiency, η, in both systems at different vpi and fT. From FIG. 12, it may be seen that comparing with the typical system, the efficiency in the proposed system, ηprp, has been improved, particularly at lower power levels and higher operating frequency. According to FIG. 12, in the typical topology, there is a decreasing trend in the efficiency, ηcnv, as power level decreases. At fT=20 kHz, ηcnv decreases modestly from about 91% to 88% following mp dropping to 50%. At fT=70 kHz, ηcnv reduction is more considerable such that it changes from 84% to 70%. In contrast, no significant change in efficiency is observed in the proposed system under different primary voltage levels. However, approximately 3% difference between efficiency levels at fT=20 kHz and 70 kHz is noted.

From the foregoing it will be seen that a converter is provided which includes a first and second switching means to create a desired input signal.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A device, comprising:
   a resonant circuit with at least one coil that is configured to transfer power inductively;
   a first switching stage that connects the resonant circuit to a plurality of DC sources; and
   a second switching stage that includes an H bridge inverter that connects the first switching stage to the resonant circuit;

wherein the first switching stage switches at a switching frequency that is a multiple of the resonant frequency of the resonant circuit,
wherein the first switching stage includes at least:
a first portion that includes a first voltage source of the plurality of DC sources and two first switches configured to switch the first voltage source into and out of the resonant circuit; and
a second portion that includes a second voltage source of the plurality of DC sources and two second switches configured to switch the second voltage source into or out of the resonant circuit,
wherein a third voltage source of the plurality of DC sources is directly connected to the first portion and/or the second portion, and
wherein the first switching stage is configured so that minimum voltage supplied to the second switching stage when the device is operating is non-zero.

2. The device of claim 1, wherein the resonant circuit comprises a compensation circuit, and the compensation circuit is configured to tune the at least one coil to a frequency in the range of 60-100 kHz.

3. The device of claim 1, wherein the resonant circuit comprises a compensation circuit, the compensation circuit comprises at least one capacitor, and the at least one capacitor is arranged in parallel with the at least one coil to form the resonant circuit.

4. The device of claim 1, wherein the resonant circuit comprises a compensation circuit, and the compensation circuit comprises an LC circuit.

5. The device of claim 1, wherein the second switching stage is configured to be soft switched.

6. The device of claim 1, wherein the second switching stage comprises IGBT switches, and the second switching stage is configured to operate the H bridge inverter at a switching frequency greater than 40 kHz.

7. A method comprising coupling current from a plurality of DC sources to a resonant circuit via two switching stages, wherein a first of the two switching stages is switched, with a frequency that corresponds to a multiple of the resonant frequency of the resonant circuit, to couple current from the DC sources to the second of the two switching stages, and the second of the two switching stages includes an H bridge inverter and is switched to couple current from the first switching stage to the resonant circuit for inductive power transfer,
wherein the first switching stage includes at least:
a first portion that includes a first voltage source of the plurality of DC sources and two first switches configured to switch the first voltage source into and out of the resonant circuit; and
a second portion that includes a second voltage source of the plurality of DC sources and two second switches configured to switch the second voltage source into or out of the resonant circuit,
wherein a third voltage source of the plurality of DC sources is directly connected to the first portion and/or the second portion, and
wherein the first switching stage is configured so that minimum voltage supplied to the second switching stage when the device is operating is non-zero.

8. The method of claim 7, wherein the method comprises switching the inverter with a switching frequency in the range of 60-100 kHz.

9. The method of claim 7, wherein the method comprises operating the first of the two switching stages, using selective harmonic elimination, to selectively attenuate at least one voltage harmonic.

10. The method of claim 7, wherein the method comprises operating the first of the two switching stages to selectively attenuate the third and/or ninth voltage harmonics.

11. A device comprising:
a resonant circuit with at least one coil that is configured to transfer power inductively;
a level stage that connects the resonant circuit to a plurality of DC sources; and
an inverter stage that includes an H bridge inverter that connects the level stage to the resonant circuit,
wherein the device is configured to switch the level stage to produce a signal, for the inverter stage, that has a dominant harmonic that is double the resonant frequency of the resonant circuit, and
wherein the level stage includes at least:
a first portion that includes a first voltage source of the plurality of DC sources and two first switches configured to switch the first voltage source into and out of the resonant circuit; and
a second portion that includes a second voltage source and two second switches configured to switch the second voltage source of the plurality of DC sources into or out of the resonant circuit,
wherein a third voltage source of the plurality of DC sources is directly connected to the first portion and/or the second portion, and
wherein the level stage is configured so that minimum voltage supplied to the inverter stage when the device is operating is non-zero.

12. The device of claim 11, wherein the resonant circuit comprises a compensation circuit, and the compensation circuit is configured to tune the at least one coil to a frequency in the range of 70-85 kHz.

13. The device of claim 11, wherein the resonant circuit comprises a compensation circuit, the compensation circuit comprises at least one capacitor, and the at least one capacitor is arranged in parallel with the at least one coil to form the resonant circuit.

14. The device of claim 11, wherein the resonant circuit comprises a compensation circuit, and the compensation circuit comprises an LC circuit.

15. The device of claim 11, wherein the inverter stage is configured to be soft switched.

16. A method comprising transferring power wirelessly from a resonant inductive power transfer primary, at the resonant frequency of the resonant inductive power transfer primary, wherein the method comprises generating a time-varying unipolar waveform, with a frequency that corresponds to a multiple of the resonant frequency of the resonant inductive power transfer primary, and generating a time-varying bipolar waveform, from the time-varying unipolar waveform, with a frequency that corresponds to the resonant frequency of the resonant inductive power transfer primary,
wherein the method further comprises sourcing current from a plurality of DC power sources and switching the plurality of DC power sources at different frequencies to generate the unipolar waveform,
wherein switching the plurality of DC sources at different frequencies is executed via a first switching stage and a second switching stage, the second switching stage including an H bridge inverter,
wherein the first switching stage includes at least:

a first portion that includes a first voltage source of the plurality of DC sources and two first switches configured to switch the first voltage source into and out of a resonant circuit of the resonant inductive power transfer primary; and
a second portion that includes a second voltage source of the plurality of DC sources and two second switches configured to switch the second voltage source into or out of the resonant circuit,
wherein a third voltage source of the plurality of DC sources is directly connected to the first portion and/or the second portion and,
wherein the first switching stage is configured so that minimum voltage supplied to the second switching stage when the resonant inductive power transfer primary is operating is non-zero.

17. A device comprising:
a coil that is configured to transfer power inductively;
a compensation circuit that is configured to tune the coil to an operating frequency for inductive power transfer;
a level switching stage that connects the compensation circuit to a plurality of DC sources; and
an inverter switching stage that includes an H bridge inverter that connects the first switching stage to the compensation circuit,
wherein the device is configured to switch each of the plurality of DC sources at frequencies that correspond to harmonics of the operating frequency to produce a signal, for the inverter stage, that has a dominant harmonic that is at least double the operating frequency for inductive power transfer, and
wherein the level switching stage includes at least:
a first portion that includes a first of the plurality of DC sources and two first switches configured to switch the first of the plurality of DC sources into and out of the compensation circuit; and
a second portion that includes a second of the plurality of DC sources and two second switches configured to switch the second of the plurality of DC sources into or out of the compensation circuit,
wherein a third DC source of the plurality of DC sources is directly connected to the first portion and/or the second portion, and
wherein the level switching stage is configured so that minimum voltage supplied to the compensation circuit when the device is operating is non-zero.

18. The device of claim 17, wherein the inverter switching stage comprises IGBT switches, and the inverter switching stage is configured to operate the H bridge inverter at a switching frequency greater than 40 kHz.

19. A method comprising transferring power wirelessly from a resonant inductive power transfer primary, at the resonant frequency of the resonant inductive power transfer primary, wherein the method comprises switching a plurality of DC sources at different frequencies to generate a multi-level time-varying unipolar waveform with a dominant harmonic that is at least double the resonant frequency of the resonant inductive power transfer primary, and generating a time varying bipolar waveform, from the time varying unipolar waveform, with a frequency that corresponds to the resonant frequency of the resonant inductive power transfer primary, wherein switching the plurality of DC sources at different frequencies is executed via a first switching stage and a second switching stage, the second switching stage including an H bridge inverter, wherein the first switching stage includes at least:
a first portion that includes a first voltage source of the plurality of DC sources and two first switches configured to switch the first voltage source into and out of a resonant circuit of the resonant inductive power transfer primary; and a second portion that includes a second voltage source of the plurality of DC sources and two second switches configured to switch the second voltage source into or out of the resonant circuit, wherein a third voltage source of the plurality of DC sources is directly connected to the first portion and/or the second portion, and wherein the first switching stage is configured so that minimum voltage supplied to the second switching stage when the resonant inductive power transfer primary is operating is non-zero.

20. The method of claim 19, wherein the method comprises switching the plurality of DC sources, using selective harmonic elimination, to selectively attenuate at least one voltage harmonic.

* * * * *